(12) United States Patent
Jung et al.

(10) Patent No.: US 9,451,226 B2
(45) Date of Patent: Sep. 20, 2016

(54) WHITE BALANCE METHOD FOR SHADING COMPENSATION, AND APPARATUS APPLIED TO THE SAME

(71) Applicant: HANWHA TECHWIN CO., LTD., Changwon-Si (KR)

(72) Inventors: Young Je Jung, Changwon-si (KR); Eun Jeong Kim, Changwon-si (KR)

(73) Assignee: Hanwha Techwin Co., Ltd., Changwon-si (KR)

(*) Notice: Subject to any disclaimer, the term of this patent is extended or adjusted under 35 U.S.C. 154(b) by 137 days.

(21) Appl. No.: 14/168,526

(22) Filed: Jan. 30, 2014

(65) Prior Publication Data

US 2015/0009358 A1 Jan. 8, 2015

(30) Foreign Application Priority Data

Jul. 8, 2013 (KR) .................. 10-2013-0079831

(51) Int. Cl.
*H04N 9/73* (2006.01)
*H04N 1/401* (2006.01)
*H04N 1/60* (2006.01)

(52) U.S. Cl.
CPC .............. *H04N 9/735* (2013.01); *H04N 1/401* (2013.01); *H04N 1/6027* (2013.01)

(58) Field of Classification Search
CPC .... H04N 9/735; H04N 1/6077; H04N 1/608; H04N 9/045; H04N 5/232; H04N 5/772; H04N 5/335; H04N 5/23293; G09G 2320/0666
USPC ...................................... 348/223.1
See application file for complete search history.

(56) References Cited

U.S. PATENT DOCUMENTS

| 6,891,648 B2 | 5/2005 | Inoue et al. | |
| 2004/0212696 A1* | 10/2004 | Tsugita et al. | 348/231.6 |
| 2010/0039528 A1* | 2/2010 | Ogasahara et al. | 348/223.1 |
| 2011/0279703 A1* | 11/2011 | Lee | 348/223.1 |
| 2013/0050236 A1* | 2/2013 | Hsu | G09G 5/02 345/589 |

FOREIGN PATENT DOCUMENTS

| JP | 2009-225440 A | 10/2009 |
| KR | 10-0325806 B1 | 2/2002 |
| KR | 10-2010-0001807 A | 1/2010 |
| KR | 10-2011-0004646 A | 1/2011 |

\* cited by examiner

*Primary Examiner* — Sinh Tran
*Assistant Examiner* — Selam T Gebriel
(74) *Attorney, Agent, or Firm* — Sughrue Mion, PLLC (57) ABSTRACT

The present disclosure relates to a white balance method for performing a shading compensation, and more particularly, a white balance method for performing a shading compensation, in which a white balance control is initiated for an input image captured when a camera is driven, and then the shading compensation is performed together during a process of performing the initiated white balance control. The white balance method for performing a shading compensation includes executing a white balance for adjusting a color temperature of an input image, extracting a shading gain table corresponding to the color temperature among pre-stored shading gain tables for each color temperature during the execution of the white balance, executing a shading compensation for an image for each block of the input image by using the extracted shading gain table, and terminating the white balance.

14 Claims, 5 Drawing Sheets

N WHITE IMAGES

FIG. 3

DIVIDED WHITE IMAGE TO M BLOCKS

WHITE BALANCE METHOD FOR SHADING COMPENSATION, AND APPARATUS APPLIED TO THE SAME

CROSS-REFERENCE TO RELATED APPLICATION

This application claims priority from Korean Patent Application No. 10-2013-0079831, filed on Jul. 8, 2013 in the Korean Intellectual Property Office, the disclosure of which is incorporated by reference herein in its entiry.

BACKGROUND

1. Field

The present disclosure relates to a white balance method for performing a shading compensation, and more particularly, a white balance method for performing a shading compensation, in which a white balance control is initiated for an input image captured when a camera is driven, and then the shading compensation is performed together during a process of performing the initiated white balance control.

2. Description of the Related Art

As a number of pixels of an image sensor increases and a viewing angle of a mounted and downsized lens is widened, a diameter of the lens is decreased which causes an incident angle of a chief ray to increase. As a result, the brightness in the center area of an image taken through the lens is greater than the brightness of an area surrounding the center of the image, or a lens shading phenomenon is generated. The lens shading phenomenon is where colors of the area surrounding the center of the image are distorted.

The related art attempts to solve these problems by compensating for shading by using a separate memory, or by performing a separate image processing on the image.

However, the shading compensating methods of the related art include a separate control performing process for avoiding a shading phenomenon. Due to this separate control performing process a processing time is increased, and a processing module for performing the separate control performing process for avoiding the shading phenomenon needs to be additionally included in a chip form.

SUMMARY

The present disclosure provides a white balance method for a shading compensation. The white balance method uses a processing module to control the white balance. The processing module performs shading compensation together with controlling the white balance. That is the present disclosure provides a processing module for controlling the white balance which is different from a processing module requiring a separate process for a shading compensation.

The present disclosure is not limited to the aforementioned matters, and those skilled in the art will clearly understand, through the following description, that the present disclosure may provide other non-mentioned features.

Accordingly, in the present disclosure, the processing module that control a white balance also performs a shading compensation, instead of a different processing module performing the shading compensation as in the related art As a result, there is an advantage in that it is possible to prevent a processing time according to each of the white balance control and the shading compensation from being delayed, and it is not necessary to include an additional processing module for preventing an image distortion due to a shading phenomenon.

One or more exemplary embodiments of the present disclosure include a white balance method for performing a shading compensation, the method includes executing, using a processor, a white balance for adjusting a color temperature of an input image; extracting, using the processor, a shading gain table corresponding to the color temperature among pre-stored shading gain tables for each color temperature during the execution of the white balance; executing a shading compensation for an image for each block of the input image by using the extracted shading gain table; and terminating the white balance.

One or more exemplary embodiments of the present disclosure include a white balance control apparatus for a shading compensation, the apparatus includes a storage module configured to store shading gain tables, so that each color temperature has a corresponding shading gain table; and a white balance processing module configured to extract a shading gain table corresponding to a color temperature of an input image during an execution of a white balance for adjusting the color temperature of the input image, and execute a shading compensation for an image for each block of the input image by using the extracted shading gain table.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Like reference numerals refer to like elements throughout the specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Exemplary Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, an exemplary embodiment of the present disclosure will be described in detail with reference to the accompanying drawings.

Figure 1:
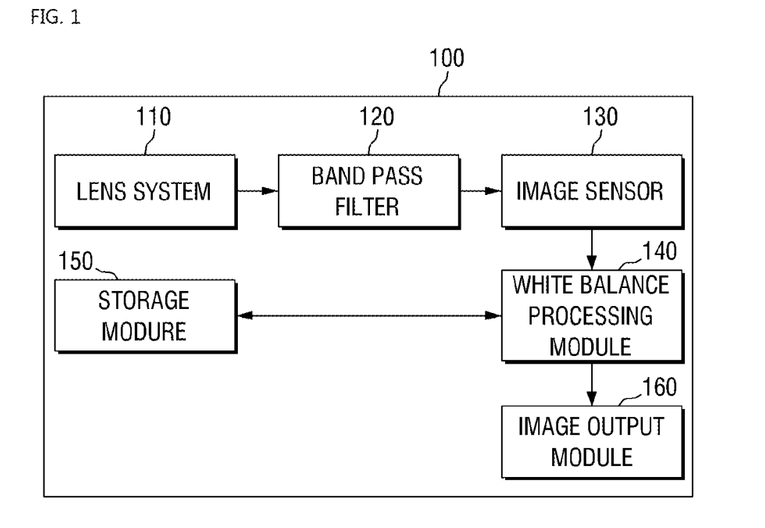
FIG. 1 is a diagram illustrating an exemplary embodiment of a white balance control apparatus according to the present disclosure.

FIG. 1 is a diagram illustrating an exemplary embodiment of a white balance control apparatus 100 according to the present disclosure. The white balance control apparatus 100 is related to a process of detecting an environmental characteristic for an image attribute, such as a color temperature, and then performing an image interpolation process corresponding to the detected environmental characteristic. As illustrated in FIG. 1, the white balance control apparatus 100 includes a configuration in which a shading compensation is also performed by an algorithm controlling a white balance.

Here, the environmental characteristic is a concept based on a color attribute of a combination including one or more of a lens system 110, a band pass filter 120, and an image sensor 130 of a camera.

To this end, when executing a shading compensation for preventing at least one of a color and brightness of a surrounding area of an image from being distorted while executing a white balance for matching the image to an image with the color temperature conforming to the aforementioned environmental characteristic together, the white balance control apparatus 100 may be divided into a plurality of configurations. The configurations include a first configuration for a preprocessing of generating a shading gain table for generating a compensation value of the aforementioned shading compensation, and a second configuration for executing an algorithm executing a shading compensation during the execution of the white balance for an actually input image.

That is, the white balance control apparatus 100 may include a white balance processing module 140, which is the aforementioned second configuration, an image output module 160 for outputting a white balance processed image on a screen, and a storage module 150 for storing various information for an image compensation.

Because environmental characteristics of an input image are diverse, various information stored in the storage module 150 may include a shading gain table for each color temperature capable of corresponding to various environmental characteristics The white balance processing module 140 may extract, during the execution of the white balance for adjusting a color temperature of the input image, a shading gain table corresponding to the environmental characteristic of the input image among the shading gain tables for each color temperature stored in the storage module 150, and execute a shading compensation for an image for each block of the input image by using the extracted shading gain table.

The input image may be an image captured through the camera.

The shading gain table for each color temperature refers to a table generated based on characteristic data corresponding to a selected white frame by dividing a white image captured for each color temperature into M blocks, and selecting a valid white block belonging to a predetermined white frame range based on a predetermined value corresponding to the divided N blocks.

The characteristic data may be expressed in a form of a characteristic curve including an X axis as a value of Dr and a Y axis as a value of Db. and hereinafter, the exemplary embodiment in which the characteristic data is used for the characteristic curve will be described.

Figure 2:
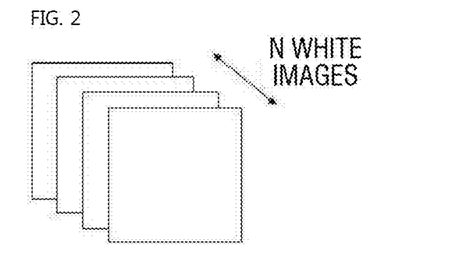
FIG. 2 is a diagram illustrating a capture concept of a white image according to an exemplary embodiment of the present disclosure.
Figure 3:
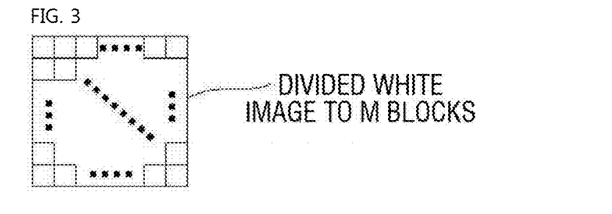
FIG. 3 is a diagram illustrating an exemplary embodiment of a block division for a captured image of FIG. 2.
Figure 4:
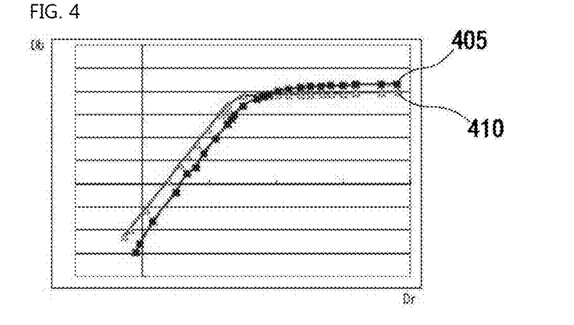
FIG. 4 is a diagram illustrating an exemplary embodiment of a characteristic curve according to the present disclosure.

The characteristic curve will be described below with reference to FIGS. 2 to 4.

First, in order to generate the characteristic curve, N white images are captured for each color temperature, each of the N white images for each color temperature is divided into M small blocks, an RGB average value is calculated for each of the M blocks, the calculated RGB average value of the block is converted to a normalized YDrDb value, and then an average YDrDb value of the entire blocks is calculated by using the YDrDb value for each block.

An average YDrDb value is identically calculated for the N white image for each color temperature by the same method, and the N white images of which the average YDrDb value is calculated for each color temperature is indicated with a curve having the X axis as a value of Dr and the Y axis as a value of Db.

Figure 5:
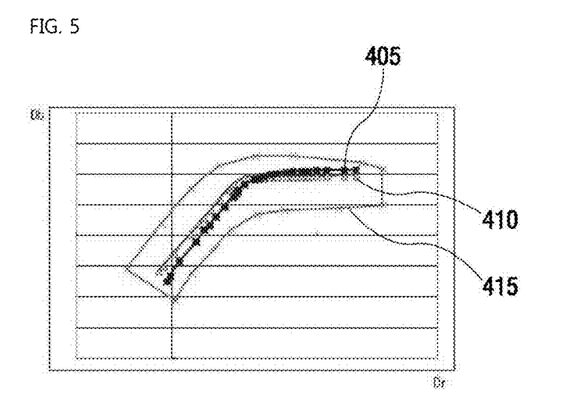
FIG. 5 is a diagram illustrating an exemplary embodiment of a boundary region based on the characteristic curve illustrated in FIG. 4.

That is, the characteristic curve is an approximation of the YDrDb value for each color temperature in the indicated curve to a 2-dimensional expression. FIGS. 4 and 5 illustrate the characteristic curve of a first color temperature 405 and a second color temperature 410. As illustrated in FIG. 4, each point of the characteristic curves 405 and 410 refers to a reference point (Dr, Db) for the corresponding color temperature.

The shading gain table may include a color shading gain table and a luminance shading gain table. The color shading gain table is for compensating for color distortion for a center area and a surrounding area of an input image. The luminance shading gain table is for compensating for brightness distortion for the center area and the surrounding area of the input image.

Information about the shading gain table for each color temperature may be already stored in the storage module 150 as a default, or may be downloaded to the storage module 150 by accessing a related server providing image compensation services through a communication connection, such as a web connection.

The white balance processing module 140 divides the input image into M blocks, identifies whether each of the blocks is included in a white frame, calculates an average RGB value and an average YDrDb based on a valid white block according to a result of the identification, and then calculates an R gain value and a B gain value for applying the white balance based on the average RGB value.

Then, the white balance processing module 140 selects a matrix, a color shading table, and a luminance shading table for each color temperature by matching the average YDrDb value with each reference point of the characteristic curve and finding a color temperature of the input image, calculates an R gain value and a B gain value for each block of the input image based on a result of the selection, and then applies the calculated R gain value and B gain value to an image processing.

When the algorithm for the input image is applied through the present disclosure, a converted YCrCb value may be reconverted to the normalized YDrDb value through an expression below.

$$Dr=(Cr/Y)*a, Db=(Cb/Y)*a \qquad \text{<Expression>}$$

Where "a" is a normalized value.

Referring to FIG. 5, a white frame boundary region 415 based on the characteristic curves may be confirmed. That is, in a case where the YDrDb value of each block is applied to the point (Dr, Db) on the characteristic curve, and is positioned within the aforementioned white frame boundary region 415, the YDrDb value may be acknowledged as a valid white value.

In a case where the algorithm of the present disclosure is applied, when the input image is divided into M blocks, the YDrDb value for each block is converted, and the converted YDrDb value is applied to a point (Dr, Db) on a corresponding characteristic curve, whether each YDrDb value is positioned within the white frame boundary region 415 based on the characteristic curve is identified, and then only the block positioned within the white frame boundary region 415 is recognized as the white block, and an average RGB value and an average YDrDb value of the blocks which are identified as the valid white blocks are calculated.

Based on information stored in the storage module 150 the white balance processing module 140 divides an input image, which is input when the camera is driven, into an image for each block, then the white balance processing module 140 performs a white balance compensation while executing the shading compensation. The shading compensation applies a separate color gain compared to that for the center for the divided image for each block.

Figure 6:
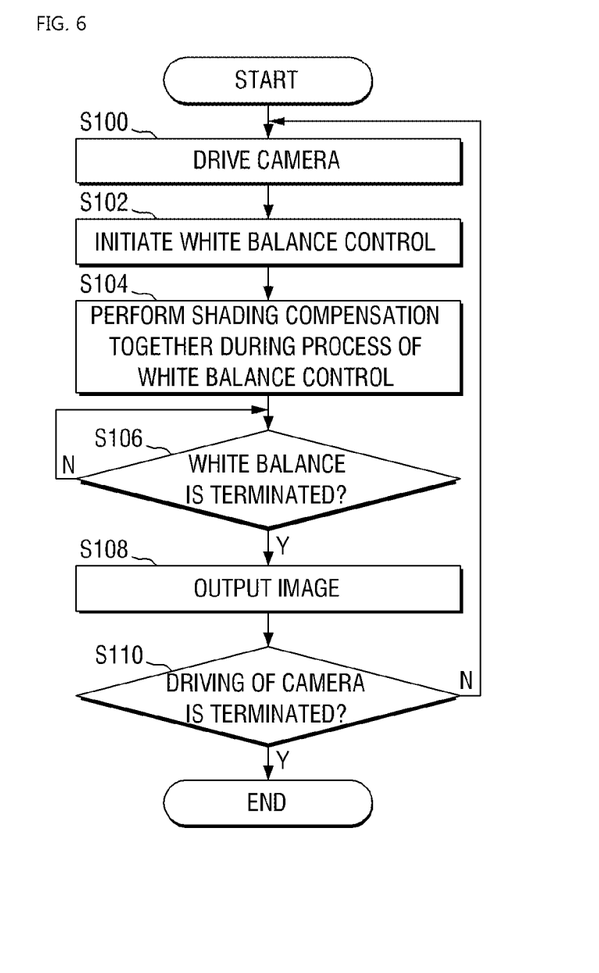
FIG. 6 is an exemplary embodiment of a diagram illustrating an operation process of the white balance control apparatus illustrated in FIG. 1.

FIG. 6 is a diagram illustrating an operation process of the white balance control apparatus 100 illustrated in FIG. 1. As illustrated in FIG. 6, the white balance control apparatus 100 initiates a white balance for an input image input when the camera is driven (S100 and S102).

Then, the white balance, which compensates for the image in accordance with a color temperature conforming to an environment in which the camera captures the image, is performed, and during the performance of the white balance a shading compensation function for compensating for a distortion of a surrounding area of the image is activated (S104).

In a case where the image passing through the white balance control algorithm of step S104 is output on the screen, the image, on which both the white balance and the shading compensation have been performed, is output on the screen (S106 and S108).

Then, when the driving of the camera is terminated, the performance of the aforementioned respective steps is also terminated (S110).

Figure 7:
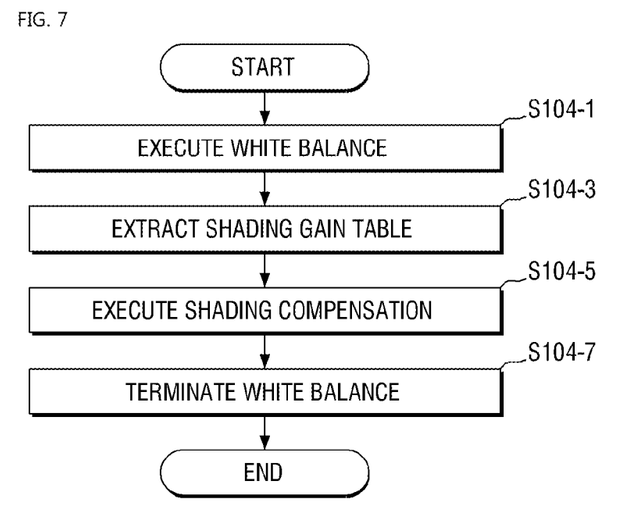
FIG. 7 is a diagram illustrating an exemplary embodiment of an algorithm execution process in the operation process illustrated in FIG. 6.

A detailed process (S104) of performing the shading compensation during the execution of the white balance will be described with reference to FIG. 7.

That is, the white balance method for performing the shading compensation may include executing the white balance for adjusting the color temperature of the input image (S104-1), extracting a shading gain table corresponding to the color temperature among the pre-stored shading gain tables for each color temperature during the execution of the white balance (S104-3), executing the shading compensation for the image for each block of the input image by using the extracted shading gain table (S104-5), and terminating the currently executed white balance (S104-7).

Extracting a shading gain table (S104-3) is started by dividing the input image, which is input when the camera is driven, into M blocks, and calculating an RGB average value for each divided block.

Then, the RGB average value for each block is converted to the YDrDb value, and the converted YDrDb value for each block is applied to a predetermined white frame to select a valid white block.

Then, the valid white blocks are selected by applying the YDrDb value for each block to the predetermined white frame, a YDrDb average value for the YDrDb values of the selected white blocks is calculated, a position on the characteristic curve corresponding to the calculated YDrDb average value is specified, and then a matrix, a color shading gain table, and a luminance shading gain table are selected based on the specified point.

In the meantime, in executing the shading compensation (S104-5), a reference R gain value and a reference B gain value are calculated based on the RGB average value of the valid white block for the input image. The an R gain value and a B gain value for each block are calculated by applying the reference R gain value and the reference B gain value to the shading gain table.

Then, the R gain value and the B gain value for each block are divided into a Y signal and a C signal, and the shading compensation is performed on at least one of the divided Y signal and C signal.

That is, the calculated R gain value and B gain value are calculated as "an R1 value, a G1 value, and a B1 value" based on the RGB average value calculated through the white frame and through an RGB to RGB conversion matrix.

Then, "R1 gain value=G1 value/R1 value, and B1 gain value=G1 value/B1 value" are calculated, and the R gain value and the B gain value may be calculated through expressions below.

$R$ gain value=$R1$ gain value*$Rn$ gain value,$B$ gain value=$B1$ gain value*$Bn$ gain value     <Expression>

Where Rn gain value=R gain value for each block, and Bn gain value=B gain value for each block.

Then, the R gain value and the B gain value for each block are divided into a Y signal, which is a color signal for brightness, and a C signal, which is a color signal for a color, and the shading compensation is performed on at least one of the divided Y signal and C signal.

Figure 8:
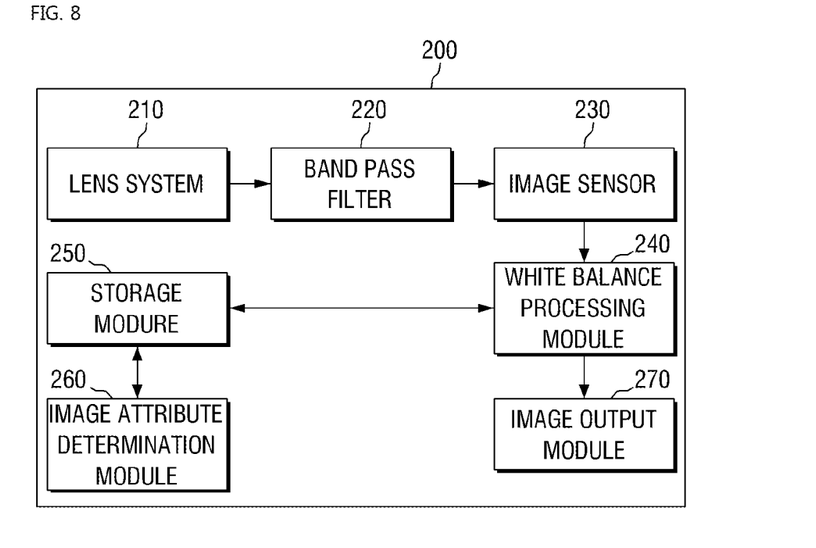
FIG. 8 is a diagram illustrating another exemplary embodiment of a white balance control apparatus according to the present disclosure.

FIG. 8 is a diagram illustrating another exemplary embodiment of a white balance control apparatus 200 according to the present disclosure. As illustrated in FIG. 8, the white balance control apparatus 200 may determine whether a color attribute by a combination of one or more of a lens system, a band pass filter, and an image sensor is changed when a camera is driven.

In a case where the color attribute is changed according to the result of the determination when the camera is driven, the white balance control apparatus 200 additionally determines whether information about a characteristic curve and a shading gain table corresponding to the changed color attribute (or, also referred to as an image attribute) is included.

When the information about the characteristic curve and the shading gain table corresponding to the changed color attribute (or, also referred to as the image attribute) is not included according to the result of the additional determination, a process of generating the information about the characteristic curve and the shading gain table corresponding to the changed color attribute (or, also referred to as the image attribute) is further executed.

The determination as to whether the color attribute is changed and the generation of the information about the characteristic curve and the shading gain table corresponding to the changed color attribute (or, also referred to as the image attribute) may be executed by an image attribute determination module 260 additionally included to the white balance control apparatus 200, or may be performed by the white balance processing module 240 mentioned in the exemplary embodiment of FIG. 1.

In the determination as to whether the color attribute is changed or the generation of the information about the characteristic curve and the shading gain table corresponding to the changed color attribute (or, also referred to as the image attribute) by the image attribute determination module 260 or the white balance processing module 240, a process of capturing a white image for each color temperature for the input image when the camera is driven, dividing the captured white image into N blocks, and calculating an RGB average value for each divided block is performed.

Then, an RGB average value of the entire blocks is calculated based on the RGB average value for each block, the RGB average value of the entire blocks is converted to a normalized YCrCb value, and then a normalized YDrDb value for an Y signal is calculated in order to remove an error for a change in a size of a CrCb value for the Y signal.

The converted YCrCb value may be reconverted to the normalized YDrDb value through an expression below.

$Dr=(Cr/Y)*a, Db=(Cb/Y)*a$     <Expression>

Where "a" is a normalized value.

A YDrDb value of the average of the entire blocks is calculated by using the YDrDb value for each block, and then a YDrDb table for each color temperature is generated by applying the YDrDb value of the average of the entire blocks to the input image for each color temperature.

Then, the characteristic curve in accordance with a white balance control environment may be calculated through the generated YDrDb table for each color temperature.

When a reference point of the characteristic curve for each color temperature is specified according to projection of the YDrDb value for each color temperature measured when the camera is driven, the characteristic curve calculated as described above is used for a method of matching an RGB to RGB conversion matrix with a shading gain table for each color temperature based on the specified reference point.

Figure 9:
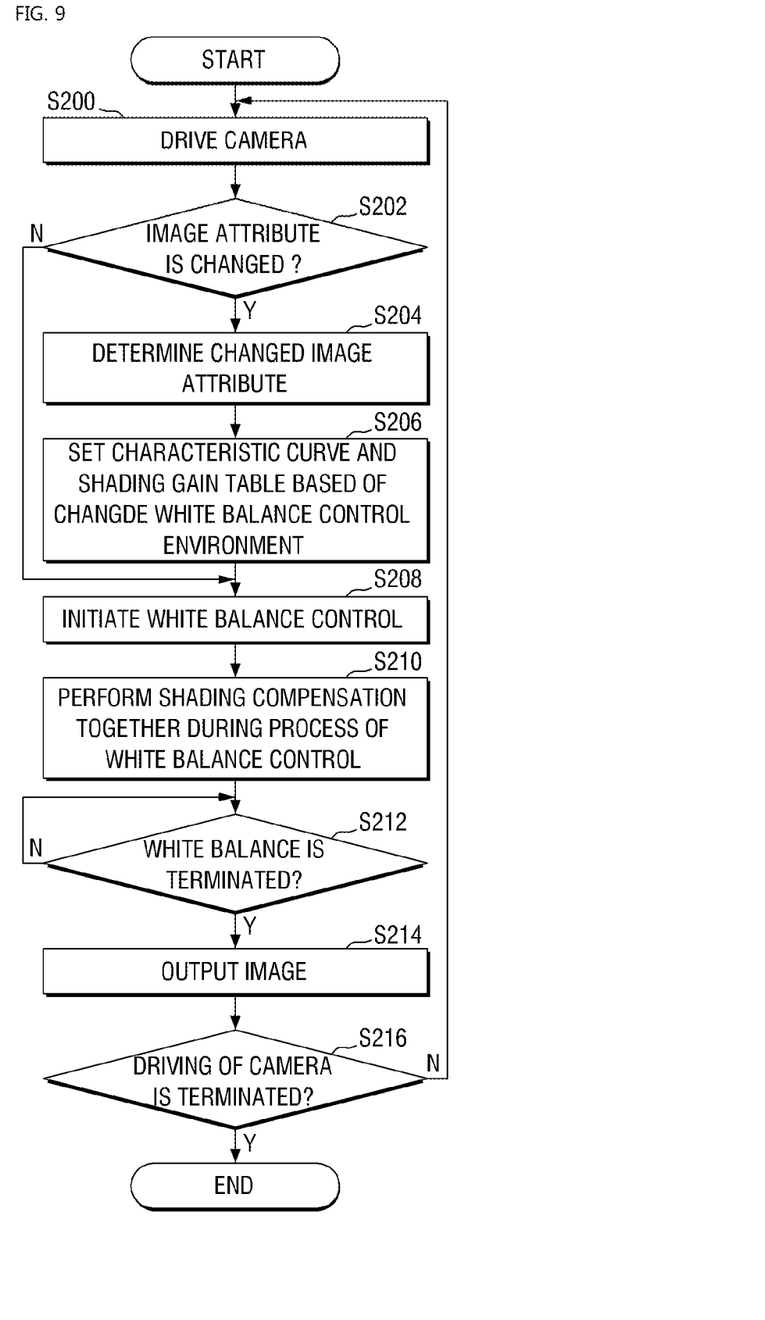
FIG. 9 illustrates an exemplary embodiment of a diagram illustrating an operation process of the white balance control apparatus illustrated in FIG. 8.

FIG. 9 is a diagram illustrating an operation process of the white balance control apparatus 200 illustrated in FIG. 8 as an exemplary embodiment. As illustrated in FIG. 8, the white balance control apparatus 200 may determine whether a color attribute is changed when the camera is driven by a combination of one or more of a lens system, a band pass filter, and an image sensor (S200 and S202).

In response to the image attribute changing (Y at S202), a process of setting a characteristic curve and a shading gain table based on a changed white balance control environment is executed (S204 and S206).

In setting the characteristic curve and the shading gain table (S206), the characteristic curve and the shading gain table corresponding to the changed image attribute may not be included. In such a case, a further process of generating information about the characteristic curve and the shading gain table corresponding to the changed image attribute is performed.

When a white balance for the input image of the camera is initiated (S208), a shading gain table corresponding to a characteristic curve for measuring the corresponding white balance control environment as specific data is extracted, and then the shading compensation is performed while performing the white balance control based on the extracted shading gain table (S210).

When the image passing through the white balance control algorithm of (S210) is output on a screen, the image on which the white balance and the shading compensation are performed is output on the screen (S212 and S214).

Then, when the driving of the camera is terminated, the performance of the aforementioned processes are also terminated (S216).

The foregoing is illustrative of the present disclosure and is not to be construed as limiting thereof. Although a few exemplary embodiments of the present disclosure have been described, those skilled in the art will readily appreciate that many modifications are possible in the exemplary embodiments without materially departing from the novel teachings and advantages of the present disclosure. Accordingly, all such modifications are intended to be included within the scope of the present disclosure as defined in the claims. Therefore, it is to be understood that the foregoing is illustrative of the present disclosure and is not to be construed as limited to the specific exemplary embodiments disclosed, and that modifications to the disclosed exemplary embodiments, as well as other embodiments, are intended to be included within the scope of the appended claims. The present disclosure is defined by the following claims, with equivalents of the claims to be included therein.

What is claimed is:

1. A white balance method for performing a shading compensation, the method comprising:
    executing, using at least one processor, a white balance for adjusting a color temperature of an input image;
    extracting, using the at least one processor, a shading gain table corresponding to the color temperature among pre-stored shading gain tables for each color temperature by using an average value for corresponding a reference point on the color temperature of a selected valid white block that corresponds to a predetermined white frame among M blocks divided from the input image;
    executing a shading compensation for an image for each block of the input image by applying an average RGB value of the selected valid white block of the extracted shading gain table; and
    terminating the white balance,
    wherein the executing of the shading compensation comprises:
    calculating a reference R gain value and a reference B gain value based on the RGB average value of the valid white block for the input image;
    calculating an R gain value and a B gain value for each block by applying the reference R gain value and the reference B gain value to the shading gain table;
    dividing the R gain value and the B gain value for each block to a Y signal and a C signal; and
    executing a shading compensation for at least one of the Y signal and the C signal.

2. The white balance method of claim 1, further comprising:
    generating a shading gain table for each color temperature.

3. The white balance method of claim 1, wherein the shading compensation applies a separate color gain compared to that for a center for the image for each block of the input image by using the extracted shading gain table.

4. The white balance method of claim 2, wherein the shading compensation applies a separate color gain compared to that for a center for the image for each block of the input image by using the extracted shading gain table.

5. The white balance method of claim 2, wherein the generating of the shading gain table for each color temperature includes:
    capturing a white image for each color temperature;
    dividing the captured white image into M blocks, and calculating an RGB average value for each of the M blocks;
    converting the RGB average value for each of the M blocks to a normalized YCrCb value, and reconverting the normalized YCrCb value to a normalized YDrDb value;
    calculating a YDrDb average value by averaging the normalized YDrDb values from each of the M blocks;
    calculating a YDrDb table for each color temperature by applying the YDrDb average value to each color temperature; and
    selecting a valid white frame by using the YDrDb table for each color temperature, and generating the shading gain table for each color temperature based on characteristic data corresponding to the selected frame.

6. The white balance method of claim 1, wherein the extracting of the shading gain table includes:
    dividing the input image into M blocks, and calculating an RGB average value for each of the M blocks;
    converting the RGB average value for each of the M blocks to a YDrDb value;
    selecting a valid white block corresponding to a predetermined white frame based on the YDrDb value;
    calculating a YDrDb average value for the YDrDb value for each selected white block;
    determining characteristic data including the YDrDb average value; and
    extracting a shading gain table corresponding to the characteristic data among the shading gain tables for each color temperature.

7. The white balance method of claim 2, wherein the extracting of the shading gain table includes:
    dividing the input image into M blocks, and calculating an RGB average value for each of the M blocks;
    converting the RGB average value for each of the M blocks to a YDrDb value;
    selecting a valid white block corresponding to a predetermined white frame based on the YDrDb value;
    calculating a YDrDb average value for the YDrDb value for each selected white block;
    determining characteristic data including the YDrDb average value; and
    extracting a shading gain table corresponding to the characteristic data among the shading gain tables for each color temperature.

8. The white balance method of claim 2, wherein the executing of the shading compensation includes:
    calculating a reference R gain value and a reference B gain value based on the RGB average value of the valid white block for the input image;
    calculating an R gain value and a B gain value for each block by applying the reference R gain value and the reference B gain value to the shading gain table;
    dividing the R gain value and the B gain value for each block to a Y signal and a C signal; and
    executing a shading compensation for at least one of the Y signal and the C signal.

9. A white balance control apparatus for a shading compensation, the apparatus comprising:

a storage module configured to store shading gain tables, so that each color temperature has a corresponding shading gain table; and a white balance processing module configured to extract a shading gain table corresponding to a color temperature of an input image by using an average value for corresponding a reference point on the color temperature of a selected valid white block that corresponds to a predetermined white frame among M blocks divided from the input image, and execute a shading compensation for an image for each block of the input image by applying an average RGB value of the selected valid white block of the extracted shading gain table, wherein the white balance processing module:

calculates a reference R gain value and a reference B gain value based on the RGB average value of a valid white block for the input image, calculates an R gain value and a B gain value for each block by applying the reference R gain value and the reference B gain value to the shading gain table;

divides the R gain value and the B gain value for each block to a Y signal and a C signal; and executes a shading compensation for at least one of the Y signal and the C signal.

10. The white balance control apparatus of claim 9, wherein the extracted shading gain table is generated based on characteristic data corresponding to a selected white frame by dividing a white image captured for each color temperature into M blocks, and selecting a valid white block belonging to a predetermined white frame range based on a predetermined value corresponding to the M blocks.

11. The white balance control apparatus of claim 10, wherein the predetermined value is an RGB average value of each of the M blocks, and the RGB average value is converted to a value for selecting the white block by performing a YCrCb conversion and a YDrDb conversion.

12. The white balance control apparatus of claim 9, wherein the white balance processing module divides the input image into M blocks, selects a valid white block belong to a predetermined white frame range among the M blocks, determines characteristic data corresponding to the selected white block, and extracts a shading gain table corresponding to the characteristic data from among the stored shading gain tables.

13. A white balance control apparatus for a shading compensation, the apparatus comprising:

a storage module configured to store a shading gain table corresponding to a color temperature; and a white balance processing module configured to execute a shading compensation of an input image by applying an average RGB value of a selected valid white block of the shading gain table while also executing a white balance for adjusting the color temperature of the input image, wherein the white balance processing module executes the shading compensation of the input image by:

dividing the input image into M blocks, calculating an RGB average value for each of the M blocks;

converting the RGB average value for each of the M blocks to a YDrDb value;

selecting a valid white block corresponding to a predetermined white frame based on the YDrDb value, calculating a YDrDb average value for the YDrDb value for each selected white block;

determining characteristic data including the YDrDb average value; and extracting a shading gain table corresponding to the characteristic data among the shading gain tables for each color temperature.

14. The white balance control apparatus according to claim 13, wherein the input image includes a center area and an area that is adjacent to the center area, and in executing the shading compensation of the input image the white balance processing module applies a first color gain to the center area and a second color gain different from the first color gain to the area adjacent to the center area.

* * * * *